(12) United States Patent
Kübeler et al.

(10) Patent No.: US 11,745,381 B2
(45) Date of Patent: Sep. 5, 2023

(54) HAND-HELD MACHINE TOOL

(71) Applicant: Festool GmbH, Wendlingen (DE)

(72) Inventors: Matthias Kübeler, Ostfildern (DE); Marc Rusch, Esslingen (DE); Daniel Schäuble, Badenweiler (DE)

(73) Assignee: Festool GmbH, Wendlingen (DE)

( * ) Notice: Subject to any disclaimer, the term of this patent is extended or adjusted under 35 U.S.C. 154(b) by 293 days.

(21) Appl. No.: 16/973,698

(22) PCT Filed: Jun. 5, 2019

(86) PCT No.: PCT/EP2019/064730
§ 371 (c)(1),
(2) Date: Dec. 9, 2020

(87) PCT Pub. No.: WO2019/238511
PCT Pub. Date: Dec. 19, 2019

(65) Prior Publication Data
US 2021/0252733 A1    Aug. 19, 2021

(30) Foreign Application Priority Data

Jun. 12, 2018 (DE) .......................... 102018114056.8
Apr. 3, 2019 (DE) .......................... 102019108793.7

(51) Int. Cl.
*B27B 9/02* (2006.01)

(52) U.S. Cl.
CPC ..................................... *B27B 9/02* (2013.01)

(58) Field of Classification Search
CPC .. B23D 59/002; B23D 45/105; B23D 45/044; B23D 45/16; B27G 19/04; B27B 9/02;
(Continued)

(56) References Cited

U.S. PATENT DOCUMENTS 4,995,288 A * 2/1991 DellaPolla .............. B27B 27/08
83/486.1
5,930,903 A * 8/1999 Hum ........................ B27B 9/00
30/377

(Continued)

FOREIGN PATENT DOCUMENTS

| CN | 107398592 A | 11/2017 |
|---|---|---|
| DE | 102006052808 A1 | 5/2008 |

(Continued)

*Primary Examiner* — Ghassem Alie
(74) *Attorney, Agent, or Firm* — HOFFMANN AND BARON, LLP (57) ABSTRACT

A mobile machine tool including a guide element, having a guide surface, for guiding the machine tool and a workpiece surface of the workpiece to one another along a machining path. The machine tool includes a drive unit having a drive motor for driving a tool receptacle arranged on the drive unit for receiving a work tool and a detection device for detecting at least one workpiece reference which is associated, with respect to a machining path, with a machining start point where the work tool starts the machining of the workpiece or with a machining end point where the work tool ends the machining of the workpiece. The tool receptacle is designed for rotationally driving the work tool about an axis of rotation and for adjusting a penetration depth of the work tool into the workpiece by means of a depth adjustment device between depth adjustment positions.

32 Claims, 4 Drawing Sheets

(58) Field of Classification Search
CPC .. B27B 9/04; B28D 7/02; B28D 1/045; B28D 1/044
USPC ... 83/13, 395, 471.3, 473, 478, 485, 522.17, 83/522.18, 523, 581, 761; 30/90.3, 90.4, 30/92.5, 101, 123, 373, 374, 376, 377, 30/390, 394, 505
See application file for complete search history.

(56) References Cited

U.S. PATENT DOCUMENTS

| | | | | |
|---|---|---|---|---|
| 2008/0276773 | A1* | 11/2008 | Togare | B23D 45/024 83/581 |
| 2015/0266201 | A1* | 9/2015 | Nakashima | B27B 9/02 30/374 |
| 2020/0246887 | A1* | 8/2020 | Frank | B25F 5/021 |
| 2023/0036750 | A1* | 2/2023 | Sobl | B23D 45/105 |

FOREIGN PATENT DOCUMENTS

| | | |
|---|---|---|
| DE | 102007062261 A1 | 6/2009 |
| DE | 102008055058 A1 | 6/2010 |
| DE | 102009029104 A1 | 3/2011 |
| DE | 102011116873 A1 | 4/2013 |
| DE | 102012219397 A1 | 1/2014 |
| DE | 102013217290 A1 | 3/2015 |
| DE | 102015221631 A1 | 5/2017 |
| DE | 102015225392 A1 | 6/2017 |
| DE | 102016216782 A1 | 3/2018 |
| EP | 0588057 A2 | 3/1994 |

* cited by examiner

HAND-HELD MACHINE TOOL

This application claims priority based on an International Application filed under the Patent Cooperation Treaty, PCT/EP2019/064730, filed Jun. 5, 2019, which claims priority to DE 102018114056.8, filed Jun. 12, 2018 and DE 102019108793.7, filed Apr. 3, 2019.

BACKGROUND OF THE INVENTION

The invention relates to a mobile machine tool, namely, a hand-held machine tool or semi-stationary machine tool for machining a workpiece, wherein the machine tool comprises a guide element having a guide surface for guiding the machine tool and a workpiece surface of the workpiece towards one another along a machining path, in particular a machining line, wherein the machine tool comprises a drive unit having a drive motor for driving a tool receptacle arranged on the drive unit for receiving a work tool and a detection device for detecting at least one workpiece reference which is associated, with respect to a machining path, with a machining start point where the work tool is intended to start the machining of the workpiece or with a machining end point where the work tool is intended to end the machining of the workpiece.

The invention further relates to a method for operating a mobile machine tool, namely, a hand-held machine tool or semi-stationary machine tool for machining a workpiece, wherein the machine tool comprises a guide element having a guide surface for guiding the machine tool and a workpiece surface of the workpiece towards one another along a machining path, in particular a machining line, wherein the machine tool comprises a drive unit having a drive motor for driving a tool receptacle arranged on the drive unit for receiving a work tool and a detection device for detecting at least one workpiece reference which is associated, with respect to a machining path, with a machining start point where the work tool is intended to start the machining of the workpiece or with a machining end point where the work tool is intended to end the machining of the workpiece, wherein the tool receptacle is designed for rotationally driving the work tool about an axis of rotation and for adjusting the penetration depth of the work tool into the workpiece by means of a depth adjustment device of the machine tool between depth adjustment positions, wherein the work tool has, on its radially outer circumference, a cutting region for cutting into the workpiece, thereby forming a machining edge which is at different distances from the at least one workpiece reference depending on at least two depth adjusting positions in which the work tool projects at different distances from the guide surface.

Such a machine tool is for example described in DE 10 2017 129 814. An operator can for example introduce a saw cut into the workpiece.

In particular when using plunge saws, it is difficult for an operator to find the machining start point or the machining end point or both, for example to introduce a saw cut into a work plate. The operator positions the plunge saw with a careful eye, so to speak, in such a manner that the saw cut into the workpiece indeed starts at the machining start point. Handling is difficult. The same problem occurs with semi-stationary sawing, where the workpiece is moved at a guide table, for example, a support surface, relative to the work tool, for example a saw blade. In this case as well, it is not easily possible to find an exact machining start point and machining end point.

It is therefore the problem of the present invention to provide an improved machine tool.

SUMMARY OF THE INVENTION

For solving this problem, the tool receptacle in a hand-held machine tool of the type mentioned at the outset is designed for rotationally driving the work tool about an axis of rotation and for adjusting a penetration depth of the work tool into the workpiece by means of a depth adjustment device between depth adjustment positions. The work tool has, on its radial outer circumference, a cutting region for cutting into the workpiece, thus forming a machining edge which is at different distances from the at least one workpiece reference depending on at least two depth adjusting positions in which the work tool projects at different distances from the guide surface, and the machine tool uses a depth adjustment device for determining a distance value of the distance of the machining edge to at least one workpiece reference and for determining a predetermined depth value for the depth adjustment position in accordance with the distance value.

A method of the type mentioned at the outset comprises the determination of a distance value of the distance of the machining edge from the at least one workpiece reference and the determination of a predetermined depth value for the depth adjustment position based on the distance value.

A depth adjustment position can easily be set, for example, by hand and/or by motor, based on the predetermined depth value. Likewise, braking the drive unit in the depth adjustment position which is assigned to the predetermined depth value can easily be implemented, for example. The distance the determined machining edge is away from the machining start point or machining end point is taken into account in this respect.

Preferably, the distance value or the distance of the machining edge from the workpiece reference relates to a distance referring to the workpiece surface.

The reference marking can be directly attached at the machining start point and/or the machining end point. The reference marking can be directly arranged or attached on the workpiece surface.

The reference marking preferably is an optical marking. For example, the reference marking can include a line or line marking which is attached to the workpiece. But the reference marking can also be provided away from the workpiece, for example, be formed by a wall surface or side surface next to the workpiece. Furthermore, the reference marking can be arranged on a guide rail which is provided and designed for guiding the machine tool along the machining path and which can be placed onto the workpiece surface, for example.

It is advantageous if at least one workpiece reference which can be detected by the detection device includes reference markings assigned to both a machining start point and a machining end point. It is thus possible, for example, to perform a saw cut or a separating cut along the machining path from the machining start point to the machining end point. But it is also possible that only one reference marking is present, for example the one assigned to the machining start point or a reference marking assigned to the machining end point. Thus a saw cut introduced from a free side can reliably be ended at the machining end point. Furthermore, a saw cut can start at the machining start point on the workpiece surface, that is, by plunging the work tool into the workpiece surface, and terminate at any desired point of the workpiece, for example at a free end region of the workpiece or still on the workpiece surface along which the machining path runs, that is, at a distance from the free end region.

The tool receptacle has different distances from the guide surface in the depth adjustment positions. Accordingly, the work tool has different distances from the guide surface in the depth adjustment positions.

It is preferred that the guide surface of the guide element is a planar surface.

The guide element is preferably plate-shaped or has a guide plate. The guide element can also be formed by a guide plate. For example, the guide element can be a so-called saw table. But the guide element can also be a support surface for placing the workpiece thereon.

It is preferred if the axis of rotation of the tool receptacle and/or the work tool is orthogonal to a normal direction of the guide surface. It is further advantageous if the axis of rotation extends transversely to a regular working direction, which will be explained later.

In a preferred concept, the depth adjustment device is designed for continuously determining the predetermined depth value depending on a relative movement of the machine tool and the workpiece with respect to the machining path. The relative movement of workpiece and machine tool can for example be a movement directed towards the machining path and/or a movement along the machining path. The depth adjustment device generates predetermined depth values, in particular continuously, during a relative movement of machine tool and workpiece, that is, along the workpiece in the case of a hand-held machine tool and/or depending on a relative movement of machine tool and workpiece. The depth adjustment device thus determines the predetermined depth value assigned to a relative position of the machine tool and the workpiece with respect to the machining path or the regular working direction. This makes it easy, for example, to find a plunging location of the work tool into the workpiece surface, namely, the machining start point. The operator guides the hand-held machine tool along the workpiece until the machining start point is reached and the depth adjustment device generates at least one predetermined depth value indicating the plunging into the workpiece. It is just as easy to let the work tool retract from the workpiece, in that the depth adjustment device generates a predetermined depth value indicating retraction of the work tool from the workpiece when reaching the front machining edge in the working direction or regular working direction. The depth adjustment device can for example determine a constant predetermined depth value between the machining start point and reaching the front machining edge in the regular working direction, that is, that the work tool, in particular a saw blade, plunges into the workpiece up to a predetermined maximum depth. If the machine tool is stationary relative to the workpiece, for example during a sawing operation, that is, it cannot be moved forward or back, the predetermined depth value can remain the same, for example. If the work tool cuts into the workpiece at the machining start point, for example, but may not reach the maximum penetration depth into the workpiece to prevent the workpiece from engaging or cutting into the workpiece behind the machining start point in the regular working direction when the machine tool is not advanced in the regular working direction relative to the workpiece, but is stationary with respect to the workpiece, the depth adjustment device does not change the predetermined depth value.

It is preferred that the machine tool is provided for guiding the work tool along a machining path in a regular working direction. For example, teeth or other cutting means of the work tool provided at the cutting region can be driven by the drive unit such that these enter the workpiece at the front in the regular working direction from a back side facing away from the workpiece surface.

It is preferred that the depth adjustment device is designed to output a predetermined depth value indicating plunging of the work tool into the workpiece for movement in the regular working direction when the rear machining edge, viewed in the regular working direction, reaches the machining start point and/or is designed for outputting a predetermined depth value indicating the work tool retracting from the workpiece when the front machining edge, viewed in the regular working direction, reaches the machining end point. For example, the depth adjustment device outputs just one predetermined depth value between the machining start point and the machining end point, which value is assigned to a constant depth adjustment position. This allows a uniform saw cut or other machining process along the machining edge between the machining start point and the machining end point.

It is quite possible or conceivable that the machine tool and the workpiece are operated relative to one another against the regular working direction, i.e., for example, that the machine tool is moved backwards against the regular working direction, which however can result in undesirable kickback reactions. Furthermore, the workpiece can also be machined by the work tool beyond the originally envisaged machining start point. For example, a saw cut beyond the actually desired start point can be produced, which is at least undesirable in practice. The action explained below will remedy this:

Preferably, the depth adjustment device of the machine tool is designed for outputting a predetermined depth value indicating retraction of the work tool from the workpiece if the work tool is moved by a specific measure against the regular working direction and/or if the rear edge, viewed in the regular working direction, reaches the machining start point.

The work tool and/or the tool receptacle pass through a motion path having a directional component parallel to the guide surface and a directional component orthogonal to the guide surface when adjusting between depth adjustment positions, for example, an upper depth adjustment position in which the work tool does not project from the guide surface and one or more lower depth adjustment positions in which the work tool in particular projects at different distances from the guide surface. A constant advance movement along the regular working direction or against the same is not required, however. If, for example, an operator moves the machine tool forward or backward without a movement component along the regular working direction, the work tool or tool receptacle remains at the same depth adjustment position and/or the depth adjustment device determines the same depth adjustment position.

For example, the work tool or a center of the work tool, the tool receptacle or the like pivots about a depth adjustment axis in order to pivot the tool receptacle and the work tool, if arranged therein, relative to the guide surface. The depth adjustment axis has a distance from an axis of rotation of the tool receptacle or the work tool, for example.

It should be noted at this point that a linear adjustment between the depth adjustment positions would in principle also be possible, i.e., that the work tool and the tool receptacle only pass through a motion path having a directional component orthogonal to the guide surface, for example relative to the guide surface in the case the tool receptacle is linearly guided.

Due to the directional component transversely to the guide surface, the front and rear machining edges also move parallel to the guide surface, for example forward, if the work tool or the tool receptacle are pivoted in front of the guide surface. It is preferred in this embodiment that the depth adjustment device is designed for determining the predetermined depth value depending on an adjustment of the front machining edge and/or the rear machining edge as a function of the directional component parallel to the guide surface. If, for example, the guide surface and thus the tool receptacle and the work tool with the front and rear machining edges are moved along the machining path in a regular working direction forward or against this regular working direction backward, and in addition a depth adjustment is made, the depth adjustment device determines, for example by means of a travel sensor, a movement component of the front machining edge and/or the rear machining edge parallel to the guide surface, which component results from the advance of the guide surface in the regular working direction or against the regular working direction and in addition a movement component of the front and/or rear machining edge parallel to the guide surface resulting from adjustment between the depth adjustment positions.

Furthermore, there is the problem in a saw blade, for example, that the position of the front and rear machining edges depends on the penetration depth of the work tool into the workpiece. If a distance between the front machining edge and the rear machining edge depends on the penetration depth of the work tool into the workpiece, which can be provided, the depth adjustment device is advantageously designed to determine the predetermined depth value based on adjusting the front machining edge and the rear machining edge as a function of the penetration depth of the work tool. The depth adjustment device determines, for example. If the work tool penetrates deeper into the workpiece, the front machining edge moves, so to speak, forward in the regular working direction and the rear machining edge moves backward against the regular working direction.

According to a preferred concept, the machine tool has a travel sensor for determining a path length of a relative movement of the machine tool and the workpiece, in particular along the machining path or towards the machining path. The movement towards the machining path can for example be oriented in the regular working direction or against the regular working direction. The work tool is for example moved to the machining start point or to the machining end point by the movement towards the machining path.

The at least one workpiece reference can for example be a physical or optical workpiece reference or a reference feature of the workpiece. The at least one workpiece reference can be a natural reference, so to speak, which is arranged on the workpiece, for example an edge of the workpiece, an optical structure on the workpiece, for example a pattern or the like. Furthermore, the at least one workpiece reference can also be a workpiece reference individually attached to the workpiece as a reference marking, such as a line or the like. The workpiece reference can also be a temporary or virtual workpiece reference, for example a location of the workpiece, which is identified as workpiece reference. An optically detectable workpiece reference can be a reference within the visible spectrum, that is, a reference which an operator can see.

But it is also possible that the optically detectable workpiece reference is made using a marking medium which is not visible to the human eye. The workpiece reference can for example be formed based on a transparent and/or luminescent marking medium which, while not visible to the human eye, can be detected by sensors of the machine tool, for example the marking sensor explained below or the travel sensor. The sensor can for example be sensitive to the marking medium without any further action, for example, detect light in the non-visible range. Another option is to activate or bring the marking medium into an excited state by energy supplied from outside, such as by illumination, for example using ultraviolet light, such that it can be detected by the respective sensor. In this case, the machine tool or the sensor advantageously has a respective energy source or light source to activate the marking medium, for example a light source for emitting UV light.

Physical or optical workpiece references, so to speak, can be detectable by the marking sensor explained below, in particular an optical sensor, a camera, or the like.

A virtual workpiece reference is not present on the workpiece as a non-identifiable marking, but is determined and/or defined by an operating action of an operator by means of a suitable detection device. The marking sensor explained below is suitable for this, for example.

The detection device can comprise an operating means which an operator can actuate to detect the at least one workpiece reference. The operator for example presses a key as the operating means if he wishes to detect the workpiece reference. For example, a reference marking on the guide element is positioned at a location of the machining path which corresponds to the machining start point or the machining end point. The operator then actuates the operating means, such that the detection device can detect the at least one workpiece reference in this manner.

A substantially automatic or automated concept is preferred.

Preferably, the detection device of the machine tool has a marking sensor with a detection range directed at the workpiece when the machine tool is in use to determine the at least one workpiece reference if the workpiece reference is attached to or arranged on the workpiece or assigned to the workpiece. The workpiece reference is for example formed by a line or another optical marking directly on the workpiece, which marking can be detected by means of the marking sensor. It is therefore easy to detect markings assigned to the machining start point and the machining end point on or at the workpiece by the marking sensor.

A workpiece reference attached to, or arranged on, the workpiece can thus be a physical, optical or other such workpiece reference, that is, an optically detectable reference feature of the workpiece, but also a virtual workpiece reference. In the above embodiment of the invention, a workpiece reference arranged at the workpiece is to be considered a workpiece reference which is so to speak assigned to the workpiece, including for the action explained below, i.e. in that an operator defines the workpiece reference by an actuating action while there is no optical or other such visible or physical marking that serves as workpiece reference on the workpiece.

The following advantageous action or embodiment represents an as such independent invention, in particular in the context of the features of the preamble of claim 1, or a preferred further developed embodiment of the machine tool described so far:

In a machine tool according to the preamble of claim 1 or in an advantageous embodiment of the machine tool described so far, the machine tool has at least one marking sensor having a workpiece detection range which is directed at the workpiece when the machine tool is in operation to determine the at least one workpiece reference if the workpiece reference is attached to, or arranged on, or assigned to, the workpiece, and has at least one travel sensor separate from the marking sensor to determine a path length of a relative movement of the machine tool and the workpiece, in particular along the machining path, after determining the at least one workpiece reference.

It is possible that the marking sensor can determine workpiece references which are assigned with respect to the machining path to a machining start point intended for starting the machining of the workpiece by the work tool or a machining end point intended for ending the machining of the workpiece by the work tool.

This as such independent thought expresses the notion that the workpiece reference which is attached to the workpiece, for example as an optical marking, a line or the like is detected by the marking sensor but may move out of the detection range of the marking sensor during a relative movement of workpiece and machine tool. But the machine tool can determine the distance of the work tool from the reference marking by means of the travel sensor in order to start or end a saw cut or other machining of the workpiece in this manner.

The marking sensor can be arranged on board the machine tool, for example on its housing, drive unit, guide element or the like. But it is also possible that the marking sensor is a sensing device separate from and independent of the machine tool. It is therefore also an option that the marking sensor or the sensing device on the one hand and the drive unit and guide element on the other hand form separate assemblies which are not interconnected. The marking sensor or the sensing device can for example be positioned at a location of the workpiece to be referenced, for example a location where otherwise an optical marking, a line or the like would be attached to the workpiece. The sensing device or the marking sensor detects coordinates of this location and reports these coordinates, in particular wirelessly, for example by radio, optically or the like to the machine tool, for example to the depth adjustment device.

The as such independent thought can easily be used in machine tools which do not have a rotary drive for the tool receptacle, but an oscillation drive. Furthermore, routers or the like can implement the idea.

Nevertheless, it is advantageous if the tool receptacle for machine tools with a travel sensor and a marking sensor is designed for rotationally driving the work tool about an axis of rotation and can be adjusted for setting a penetration depth of the work tool into the workpiece using a depth adjustment device of the machine tool in to the workpiece.

Furthermore, it is an advantage for this machine tool if the work tool has a cutting region on its radial outer circumference for cutting into the workpiece, thereby forming a machining edge which has different distances from the at least one workpiece reference depending on at least two depth adjustment positions in which the work tool projects at different distances from the guide surface. The depth adjustment device already described can be, but does not have to be present.

In an advantageous method, the marking sensor is initially moved across one or several workpiece references or towards the workpiece references to detect their position. Then the travel sensor detects a relative movement of the machine tool relative to the respective workpiece references detected. For example, the workpiece references are assigned to a machining start point and a machining end point for machining the workpiece by the work tool.

Expediently, the marking sensor and the travel sensor comprise different physical detection concepts. For example, the marking sensor can be a camera or other sensor which can detect an optical marking or workpiece reference attached to the workpiece for that purpose. The travel sensor only needs to detect a path length, which the travel sensor determines based on an optical change of a surface structure of the workpiece surface during relative movement of workpiece and guide surface toward each other.

The travel sensor may not be designed to detect the reference marking, for example, it may not be able to recognize a reference marking, such as a line or the like, on the workpiece.

It is advantageous for a marking sensor, on the other hand, that it is not designed for detecting a path length, but specifically for detecting the reference marking attached to the workpiece.

Preferably, the travel sensor is arranged outside the detection range of the marking sensor on the machine tool, in particular the guide element, and/or at a transverse distance from the machining edge. The travel sensor can thus be arranged away from the detection range of the marking sensor to not interfere with the detection range.

But it is also possible that a sensor is provided which provides the functionality of the travel sensor and of the marking sensor. The sensor can for example be switched between a detection mode for detecting the workpiece reference and, in particular thereafter, a detection mode for detecting a distance from the workpiece reference, or it can be operated in these modes simultaneously or sequentially. For example, an optical sensor can initially be used to detect the location of the workpiece reference and then the distance from the workpiece reference can be determined if the machine tool is locally adjusted.

Various embodiments of a travel sensor are conceivable. For example, the travel sensor can comprise or be formed by at least one rolling member for rolling along a surface of the workpiece and/or at least one optical detection element, in particular of the type of a mouse sensor, and/or at least one position sensor and/or at least one magnetic sensor for detecting a geomagnetic field and/or at least one acceleration sensor. Multiple travel sensors which operate according to different physical measuring principles can easily be provided.

The travel sensor and/or the marking sensor can advantageously comprise or be formed by a camera and/or an optical sensor and/or an inductive sensor. Furthermore, the marking sensor can also be a sensor which can detect a virtual workpiece reference of the workpiece, in particular in connection with an actuating action by an operator. The sensor determines a respective location of a virtual workpiece reference, such as the machining start point and/or the machining end point, in the event of an actuating action by an operator.

The guide surface and the workpiece surface can rest directly against each other when the machine tool is in operation or the workpiece is machined. But it is also possible that they are at a distance from each other.

Advantageously, the depth adjustment device is designed for determining the predetermined depth value depending on a distance of the guide surface from the workpiece surface. The distance can for example occur when an operator intentionally does not place the guide surface onto the workpiece surface. But it can also be due to a guide rail or another guide element separate from the machine tool.

It is preferred that the depth adjustment device has at least one detection element for detecting an initial distance between the guide surface and the workpiece surface. The initial distance can in principle be a free distance between the workpiece and the guide surface. But it is also advantageous if the depth adjustment device has a detection element for detecting the presence of a guide rail, wherein the guide rail can be placed onto the workpiece surface and the guide element can be guided along the machining path on the guide rail. The detection element can for example be a distance sensor. The detection element can also be an actuating switch or other switching element, which can be actuated by an operator for setting an operation without or with guide rail or without or with a distance between the guide surface and the workpiece surface.

A calibration device, for example a calibration switch or the like, with which the depth adjustment device can be calibrated, is further advantageous. For example, the marking sensor already explained above and/or the travel sensor can be calibratable. Furthermore, the calibration device can be used to set a geometry of the work tool, in particular a radius of its outer circumference. This means that tolerances for different work tools can be learned or set.

The depth adjustment device advantageously has a depth adjustment bearing on which the tool receptacle is mounted linearly with respect to a guide surface and/or pivotably about a depth pivot axis. For example, a linear guide can be provided between the guide element and the tool receptacle, in particular the guide element and the drive unit, for linear adjustment of the drive unit or the tool receptacle relative to the guide surface. Of course, such a linear guide can in addition provided with a pivot bearing. A depth adjustment bearing is preferred which is only a pivot bearing or at least includes a pivot bearing. The depth pivot axis is expediently parallel to the guide surface of a guide plane defined by the guide surface. Preferably, the depth pivot axis runs transversely to the regular working direction or the machining path or both. The depth pivot axis is preferably parallel to the axis of rotation of the tool receptacle.

It is in principle possible that the depth pivot axis runs directly in the guide surface.

The depth pivot axis can also have a distance from the guide surface. The depth adjustment device is preferably designed for evaluating or considering this distance of the depth pivot axis from the guide surface for determining the predetermined depth value.

It is preferred that the depth adjustment device is designed for determining the distance value of the machining edge from the at least one workpiece reference depending on an angular position of the tool receptacle by which the tool receptacle is pivoted relative to the guide surface about the depth pivot axis. If the depth pivot axis is arranged at the rear with respect to the working direction, in particular if the machine tool is designed as a plunge saw, pivoting the tool receptacle about the depth pivot axis towards the workpiece surface moves the front and rear machining edges, viewed in the working direction, towards the rear in the working direction. In an embodiment of the machine tool in which the depth pivot axis is at the front in the working direction, for example in a saw with a safety guard, pivoting the tool receptacle about the depth pivot axis towards the workpiece surface moves the front and rear machining edges, viewed in the working direction, towards the front in the working direction.

It is advantageous if the depth adjustment device is designed for determining the distance value of the distance between the at least one workpiece reference and the assigned machining edge, in particular as a function of the angular position of the tool receptacle with respect to the depth pivot axis and in addition as a function of a relative movement of the machine tool and the workpiece, in particular towards the machining path and/or along the machining path. Thus the depth adjustment device evaluates a linear relative movement of tool receptacle and workpiece using the travel sensor when determining the distance value, and in addition the pivoting movement about the depth pivot axis.

Preferably, the depth adjustment device has a depth sensor for determining the depth adjustment position of the tool receptacle relative to the guide surface. The depth sensor can comprise, for example, a position sensor, a distance sensor, or the like. The depth sensor can also comprise a travel sensor. The travel sensor can for example be arranged on a linear guide or pivotal guide of the depth adjustment device. Preferably, the depth sensor comprises an angle sensor for detecting an angular position of the tool receptacle by which the tool receptacle is pivoted relative to the guide surface about the depth pivot axis.

Furthermore, the depth sensor can be formed by an actuator of the depth adjustment device or arranged on the actuator. The actuator can for example comprise a motor sensor which detects a respective position of a rotor of the motor.

For example, the drive can include a pedometer. Preferably, a pedometer on a servo motor or stepper motor, which is part of the actuator or forms the actuator as such, counts the steps of the actuator starting from a start position in which the work tool does not penetrate into the workpiece. A fine resolution, for example, more than 1.000 steps, in particular more than 100,000 steps, in particular about 115,000 steps, is advantageous.

Furthermore, the depth sensor can also be formed by activating the actuator, which can report the respective depth adjustment position set as a position signal.

Preferably, the control device or the depth adjustment device for determining the current position of the front machining edge and/or rear machining edge of the work tool is designed based on sensor values of the depth sensor. For example, the control device or depth adjustment device can determine a change of location of the respective machining edge when the work tool, in particular a saw blade, plunges into, or retracts from, the workpiece based on sensor values of the depth sensor.

It is therefore possible that the control device or depth adjustment device determines the location of the resulting front and rear machining edges based on information about the currently set penetration depth of the work tool into the workpiece, for example based on trigonometric formulas, the Pythagorean theorem or the like.

But it is also possible that the machine tool has at least one sensor with a detection range directed at the outer circumference of the work tool for determining the front machining edge and/or the rear machining edge. In this embodiment, determination by calculation based on the values of the at least one depth sensor is not absolutely necessary, but can still be implemented.

The depth adjustment device can have a depth stop, which can be adjusted to a position assigned to a depth adjustment position of the tool receptacle and where the tool receptacle or a component motion-coupled or coupled to the tool receptacle, in particular a component of the drive unit, comes to a stop in the depth adjustment position. The depth stop can be manually adjustable or by means of a servomotor, which will become clearer below.

An operator can manually set a depth adjustment position of the tool receptacle and thus of the work tool. Preferably, the depth adjustment device is designed or intended for manual adjustment by an operator into the at least one depth adjustment position, for example. This can also be implemented in connection with the motor or servomotor concept yet to be presented, that is, that the operator manually adjusts a tool receptacle which can as such be adjusted by motor in one mode of operation. But it is also possible that the tool receptacle can only be adjusted manually. It is advantageous, in particular for a manually adjustable depth adjustment device, that it has at least one return spring for adjusting the tool receptacle towards a depth adjustment position in which the work tool does not project from the guide surface. The return spring can advantageously be provided for a depth adjustment device equipped with a servomotor or a braking means, in particular of the type described below.

It is preferred that the depth adjustment device has a servomotor for moving the tool receptacle into at least one depth adjustment position and/or has a depth stop for the tool receptacle. The servomotor can for example be used for actively moving the tool receptacle between at least two depth adjustment positions.

But it is also possible that the servomotor moves a depth stop for the tool receptacle or a component comprising the tool receptacle, for example, the drive unit, into a depth adjustment position.

In another variant, the depth adjustment device has a braking means which can be controlled based on a predetermined braking value for braking the tool receptacle in at least one depth adjustment position. For example, a respective braking means, in particular a piezo brake or the like, can be provided on the depth adjustment bearing.

Advantageously, the machine tool has a control device for controlling the servomotor as a function of the predetermined depth value. The control device can for example form a part of the depth adjustment device or include the depth adjustment device.

It is further advantageous if the machine tool has a coupling means for detachably coupling the servomotor and/or the braking means to the tool receptacle. An operator can thus selectively adjust the depth adjustment position manually or by hand, or use the servomotor or braking means.

The following actions are advantageous, both for the purely manual concept and for a concept with motor or brake support:

The machine tool preferably has an output device, in particular an optical and/or acoustic one, in particular a display for outputting the predetermined depth value for an operator of the machine tool. An operator can identify the predetermined depth value(s) at the output device, for example to manually enter a suitable depth adjustment position or to monitor the operation of the servomotor or braking means.

The work tool can, for example, be designed in the manner of a milling drum or a planer. The work tool can for example have a circular cylindrical shape and the cutting region on its outer shell.

However, it is preferred if a blade-shaped cutting tool is provided, in particular a saw blade. The cutting region is provided on a narrow side of the cutting tool.

Teeth, a grit or other such abrasive means for cutting into the workpiece may be provided at the cutting region. Of course, replaceable abrasive means, such as cutting plates or the like, may be present.

According to a safety concept, the machine tool has at least one control element, in particular a dead man switch, which must be permanently and/or at predetermined time intervals actuated by an operator of the machine tool during operation to maintain operation of the machine tool. Of course, multiple such dead man switches or control elements can be provided, for example on two or more of the handles explained below. Advantageously, such a control element or dead man switch is assigned to each hand of an operator, wherein the control elements are sufficiently spaced apart that the operator will need two hands to actuate them.

It is advantageous if the machine tool has at least one handle that is fixedly attached to the guide element and/or at least one handle that is fixedly attached to the drive unit. The fixedly attached handle does not change its position even if the tool receptacle changes its position relative to the guide surface. This allows an operator to hold the machine tool optimally. The handle arranged on the drive unit for example allows haptic feedback to the operator with respect to the depth adjustment position the machine tool is taking.

Advantageously, the machine tool forms part of a system comprising the machine tool and a guide rail that can be placed onto the workpiece, wherein guide contours extending along a longitudinal axis on the guide rail and the guide element and engaging in one another in the use position of the system are arranged for guiding the guide element along the machining path.

BRIEF DESCRIPTION OF THE DRAWINGS

An embodiment of the invention is explained below with reference to the drawing. Wherein.

DETAILED DESCRIPTION

A machine tool 10 according to the drawing has a guide element 30 with a guide plate 31 on which a guide surface 32 is provided. A guide receptacle 33 for a guide projection 52 of a guide rail 50 is provided on the guide surface 32.

The machine tool 10 can be guided with its guide surface 32 directly along a workpiece surface WO of the workpiece W, for example to introduce a saw cut there. But it is also possible to place the support surface 53 of the guide rail 50 onto the workpiece surface WO to guide the machine tool 10. The guide surface 32 of the machine tool then slides along a guide surface 51, which is provided on a side of the guide rail 50 opposite the support surface 53. The guide projection 52 can in this process engage in the guide receptacle 53 to guide the machine tool 10 along a regular working direction AR.

The machine tool 10 has a drive unit 11, which comprises a drive motor 12 for driving a tool receptacle 13 about an axis of rotation D. The drive motor 12 can drive the tool receptacle 13 directly or via a transmission not shown herein. For power supply to the machine tool 10, a power supply unit 14, for example a rechargeable energy storage, in particular a battery or the like, is provided. Of course, power supply via a power cable of the machine tool 10 not shown in the drawing is also possible or conceivable, with which cable the machine tool 10 can be connected to an electric power supply network, for example, an AC voltage network.

A work tool 15 is detachably arranged on the tool receptacle 13. The work tool 15 is for example a saw blade. The work tool 15 has a plate body 16, on the radially outer circumference 17 of which a cutting region 18 is arranged, for example with saw teeth or other such cutting means.

The drive unit 11 is mounted for pivoting about a depth pivot axis SA, which runs parallel to the axis of rotation D, by means of a depth adjustment device 20.

Figure 1:
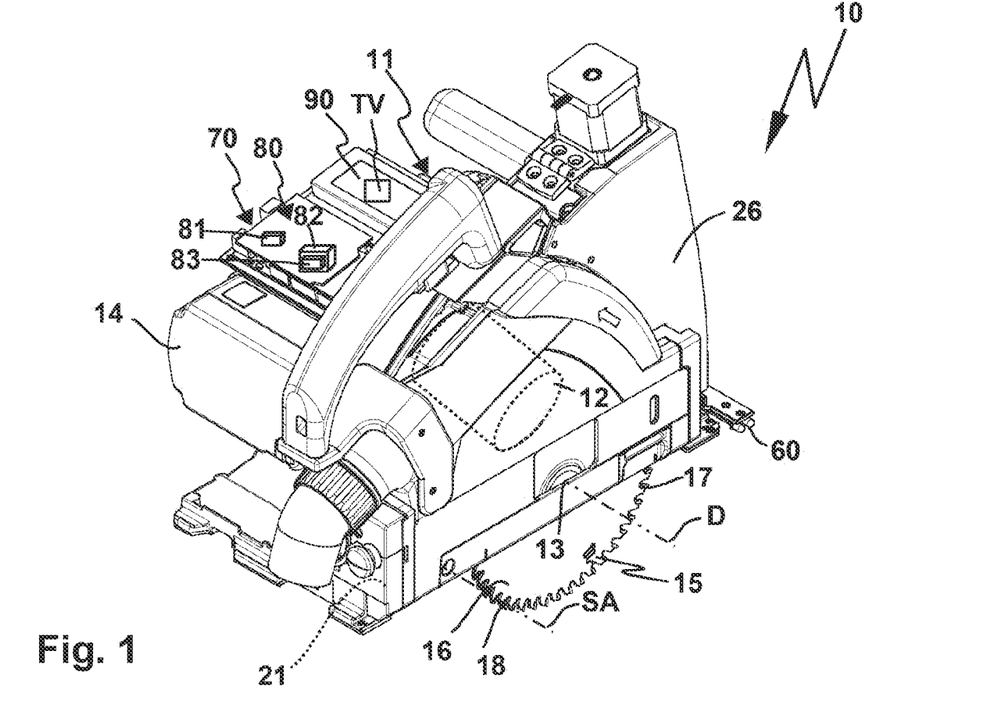
FIG. 1 shows an oblique perspective view from at an angle behind of a hand-held machine tool.
Figure 2:
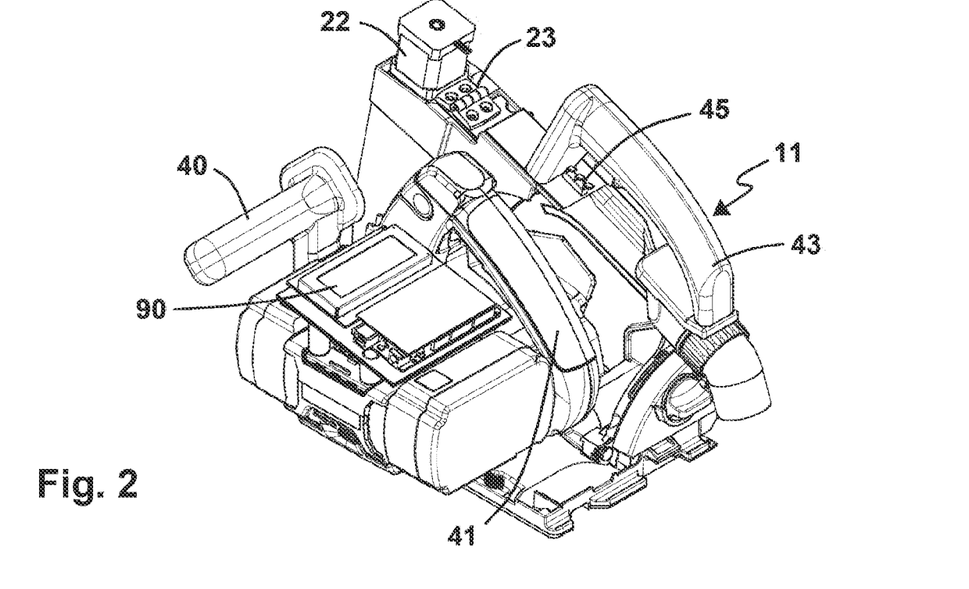
FIG. 2 shows another oblique perspective view from an opposite side, also from at an angle behind.
Figure 3:
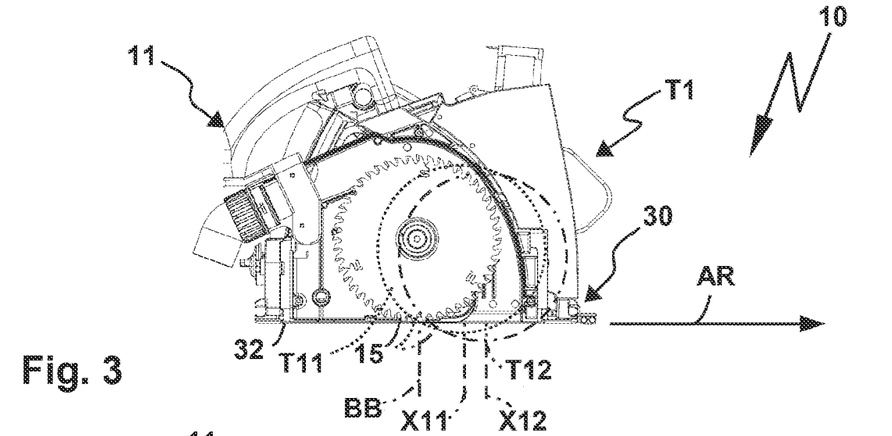
FIG. 3 shows a side view of a machine tool of the preceding figures, wherein a cover for a cutting tool is opened and the tool receptacle is shown with the cutting tool in a first depth adjustment position, in which the cutting tool does not project from a guide surface.
Figure 4:
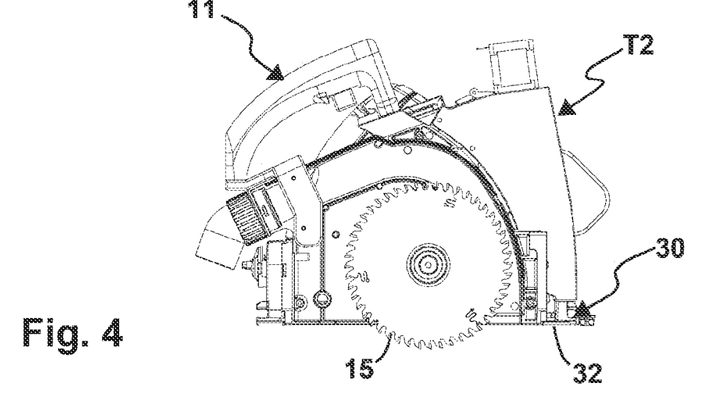
FIG. 4 shows the machine tool according to FIG. 3 in a second depth adjustment position, in which the cutting tool projects at a first distance from the guide surface.
Figure 5:
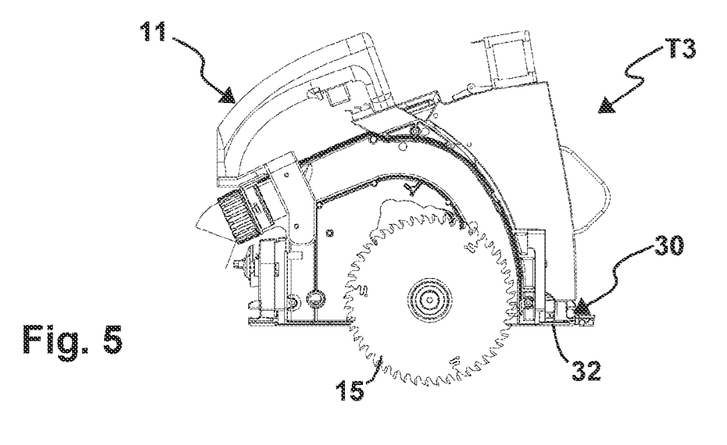
FIG. 5 shows the machine tool of FIGS. 3 and 4 in a third depth adjustment position, in which the cutting tool projects farther than in the second depth adjustment position from the guide surface.
Figure 6:
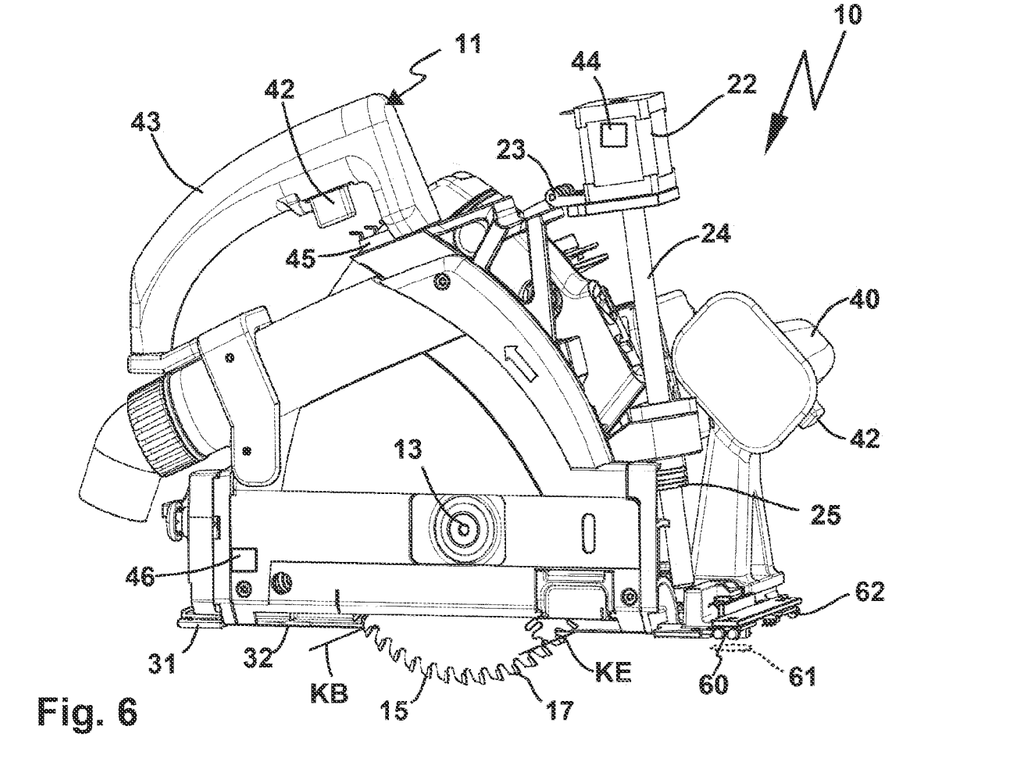
FIG. 6 shows a side view of the machine tool of the preceding figures from at an angle in front.

Thus the drive unit 11 and its tool receptacle 13 can be moved between multiple depth adjustment positions relative to the guide surface 32, of which the depth adjustment positions T1, T2, and T3 are shown as examples in FIGS. 3-5. The cutting region 18 does not project from the guide surface 32 in the depth adjustment position T1, for example, and projects gradually farther from the guide surface 32 in depth adjustment positions T2, T3. The work tool 15 cuts accordingly deep into the workpiece surface WO.

The depth adjustment device 20 comprises a depth adjustment bearing 21 arranged on the guide element 30, which supports the drive unit 11 for pivoting about the depth pivot axis SA relative to the guide element 30. In addition, the depth adjustment device 20 has a servomotor 22 for setting the depth adjustment positions, for example the depth adjustment positions T1, T2, and T3. The servomotor 22 is fastened to the drive unit 11, preferably pivotably by means of a bearing 23. The servomotor 22 drives a spindle 24, which engages in a spindle nut 25, which is stationary with respect to the guide element 30. The servomotor 22 is preferably enclosed as a whole or with respect to its movable components in a protective housing 26.

The spindle nut 25 is preferably a so-called biased spindle nut and/or a spindle nut having little or no axial clearance. This allows exact depth adjustment of the drive unit 11 or the tool receptacle 23 relative to the guide surface 32.

It would of course also be possible to arrange the servomotor 22 in a stationary manner on the guide element 30 and to fasten the spindle nut 24 to the drive unit 11. Other servomotor concepts, for example, a rotary drive which can be or is arranged on the depth adjustment bearing 21, can easily be implemented.

The servomotor 22 can follow the various angular positions of the spindle 24 relative to the guide element 30 by means of the bearing 23.

Another option is a design of the bearing 23 as a coupling means, by means of which the servomotor 22 can be uncoupled or detached from the drive unit 11. To this end, an axle element of the bearing 23 can be removed or the bearing 23 can be detached as a whole from the servomotor 23 or the drive unit 11.

The depth adjustment device 20 can use a depth sensor 44 to determine the respective depth adjustment position, for example the depth adjustment positions T1, T2, or T3 as well as other depth adjustment positions. The depth sensor 44 comprises for example a pedometer or revolution counter on the servomotor 22.

Preferably another depth sensor 45, for example a micro switch, which detects the upper end position of the drive unit 11 is provided for the upper depth adjustment position in which the work tool 15 does not plunge into, or engage in, the workpiece W.

Starting from the penetration depth of the work tool 15 into the workpiece W detected by the uppermost depth adjustment position T1, the depth sensor 44 for example detects the following other depth adjustment positions.

Alternatively or in addition to the depth sensors 44, 45, an angle sensor 46 could be provided, for example on the depth adjustment bearing 21.

An operator can grab the machine tool 10 by means of handles 40, 41, 43. The handle 40 is arranged in a stationary manner at the front of the guide element 30 in the regular working direction AR. The handle 41 is attached to the drive unit 11. The handle 43 is arranged in a stationary manner on the protective housing 26, i.e. it is also stationary with respect to the guide element 30.

Thus an operator can grab the drive unit 11, which is adjustable relative to the guide element 30 by means of the servomotor 22. The operator can also grab handles 40 and 43, which are stationary with respect to the guide element 30, i.e., such handles which do not move even if the drive unit 11 is adjusted relative to the guide element 30. At any rate, an operator can safely grab the guide element 30 using the handles 40 and 43 in order to machine the workpiece W.

The machine tool 10 is advantageously not ready for service until the operator actuates control elements 42, for example dead man switches or the like, either permanently or at predetermined time intervals. For example, control elements 42 are provided on handles 40 and 43, which are spaced apart from each other. The handles 40, 43 are spaced apart so far that the operator must enclose one of the handles 40 and 43 with one respective hand to be able to actuate the control element 42 arranged there. In this way, the operator can for example switch the machine tool 10 on, off, or maintain the switched-on state.

A marking sensor 60 is arranged at the guide element 30. The marking sensor 60 is used to determine workpiece references RB and RE, which are assigned to a machining start point BB intended for starting the machining of the workpiece W by the work tool 15 or a machining end point BE intended for ending the machining of the workpiece W by the work tool 15. The marking sensor 60 is or comprises, for example, a camera with which the workpiece references RB and RE can be detected. The workpiece references RB and RE are for example line markings or other such optically detectable markings, which are attached by an operator to the workpiece surface WO.

The work tool 15 machines the workpiece W between the machining start point BB and the machining end point BE along a machining path BA, for example it introduces a saw cut.

To this end, the machine tool and thus the marking sensor 60, for example without using the guide rail 50 or with using the same, is moved along the guide rail 50 to the workpiece references RB and/or RE, in particular across the workpiece references RB and RE in order to detect their position.

The workpiece references RB and RE are only in a detection range 61 of the marking sensor 60 if it is moved into the direct vicinity of the workpiece references RB and RE.

Figure 8:
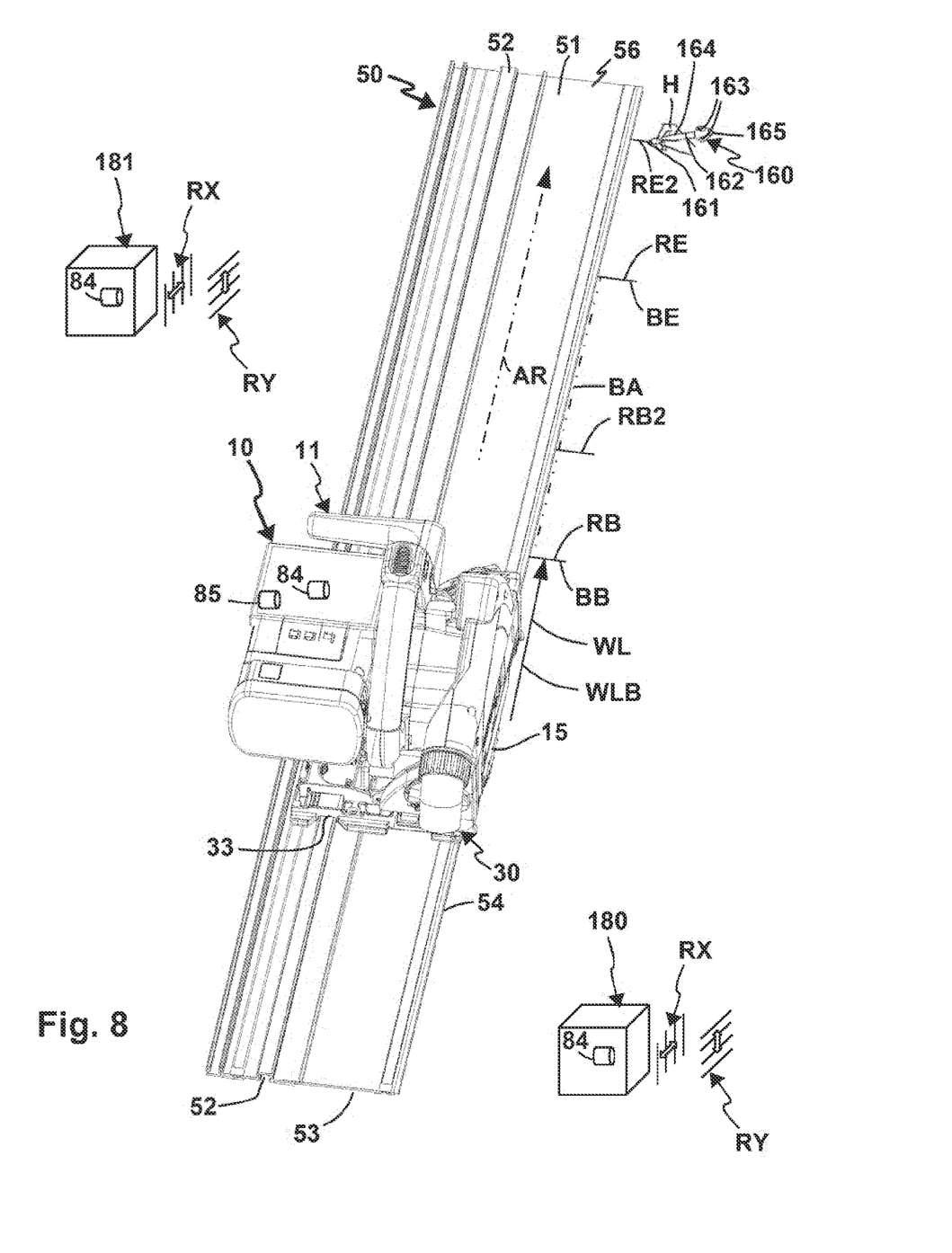
FIG. 8 shows a variant of the machine tool of the preceding figures and a guide rail for guiding the same.

The workpiece references RB and RE or workpiece references RB2 and RE2 explained below can also be detected by a mobile sensor device, which represents a marking sensor 160. The sensor device or the marking sensor 160 can be moved relative to the workpiece W separately from the machine tool 10, i.e. the hand-held machine tool 10 can remain in place, for example in the position shown in FIG. 8, while an operator determines the workpiece references RB2 and RE2 by means of the marking sensor 160. The marking sensor 160 comprises for example an in particular pen-shaped marking receiver 162. An operator can grab the marking receiver 162 with a schematically shown hand H. The marking receiver 162 is provided with, for example, a mechanical reference 161 in the form of its tip or its longitudinal end region, which an operator can bring to or direct at the location of the workpiece references RB2 and RE2; this means that the mechanical reference 161 is at a distance to the locations of the workpiece references RB2 and RE2. In this case, a light source which the operator can aim at the location of the workpiece references RB2 and RE2 is for example arranged on the marking sensor 160.

The marking sensor 160 gets its reference system for example from at least one coordinate sender 84 on board the machine tool 10 and/or on board one or several coordinate transmitters 180, 181. The coordinate sender 84 sends reference information RX and RY, for example a pattern of lines which are at an angle, for example at a right angle, to one another. The coordinate sender 84 may send the respective line pattern or the reference information RX and RY sequentially or simultaneously.

The coordinate transmitters 180, 181 comprise housings 182, for example, which are separate from the hand-held machine tool 10 and can be freely positioned, in particular placed, on the workpiece W.

Preferably, multiple coordinate senders 84 are provided, such that the marking sensor 160 can receive the reference information RX and/or RY from one or multiple sensors 163. The arrangement of the sensors 163 at a spacing from one another on the marking sensor 160 also allows triangulation or another such spatial determination of the coordinates of the workpiece references RB2 and RE2 even if only one coordinate sender 84 is present, for example only one coordinate sender 84 on board the machine tool 10.

The operator can for example actuate the marking sensor 160 for sending the coordinates of the workpiece references RB2 and RE2 using a sender 165, for example a Bluetooth transmitter or another such radio transmitter or wireless transmitter to a receiver 85 on board the machine tool 10 by means of a switching element 164.

The workpiece references RB and RE or RB2 and RE2 define a machining start point BB and a machining end point BE between which a saw cut is to be introduced into the workpiece W.

A travel sensor 62 is used to determine a distance of the machine tool 10 from the workpiece references RB and RE. The travel sensor 62 is for example designed as a mouse sensor or the like and can determine a path length WL which the machine tool 10 travels relative to the workpiece W along the motion path BA. To this end, the travel sensor 62 detects for example markings on the guide rail 50, optically detectable features on the workpiece surface WO or the like. For example, the travel sensor 62 can also determine a path length WLB to the reference marking RB and thus to the start of the motion path BA.

The travel sensor 62 and the marking sensor 60 are arranged in the same longitudinal position with respect to the regular working direction AR, but are at a transverse spacing across the motion path BA. The travel sensor 62 is thus arranged at a transverse spacing to the motion path BA when the machine tool 10 is in operation and detects the length of an adjusting path along the workpiece W parallel to the motion path BA.

When the work tool 15 engages in the workpiece W, a rear machining edge KB with respect to the regular working direction AR and a front machining edge KE with respect to the regular working direction AR are formed. The machining edge KB is assigned to the machining start point BB, the machining edge KE is assigned to the machining end point BE.

The machine tool 10 has a depth adjustment device 70 for placing the machining edge KB exactly at the machining start point BB. The depth adjustment device 70 determines for example a predetermined depth value TV based on an distance value DB of a calculated position of the machining edge KB from the machining start point BB, which the depth adjustment device outputs at an output device 90, in particular a display.

The depth adjustment device 70 for example forms a part of a control device 80. The control device 80 further comprises a processor 81 for executing program codes of a control program 83, which is or can be stored in a memory 82 of the control device 80.

The control device 80 can actuate the servomotor 22 based on the predetermined depth value TV for setting a depth adjustment position corresponding to the predetermined depth value TV, for example the depth adjustment positions T1 or T2.

Figure 7:
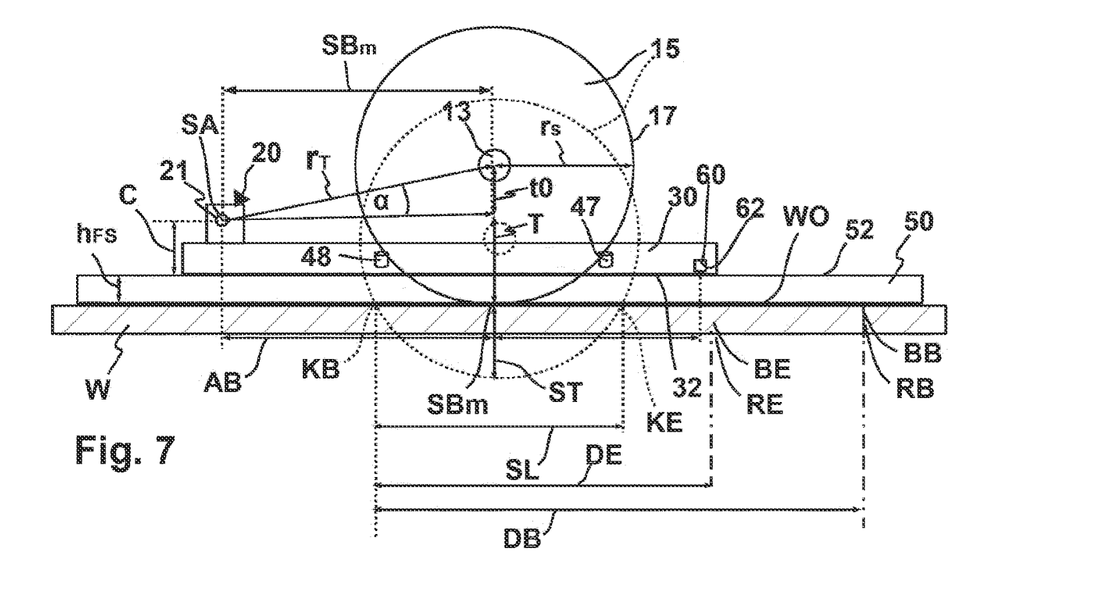
FIG. 7 shows a schematic side view of the machine tool of the preceding figures and the workpiece.

During a motion of the machine tool 10 to the machining start point, the control device moves the servomotor 22 preferably into a start position shown in FIG. 7, in which the outer circumference 17 or the cutting region 18 is still somewhat above the workpiece surface WO. This means that the work tool 15 does not yet cut into the workpiece W, but its outer circumference 17 almost adjoins the workpiece W, so to speak tangentially.

FIG. 7 shows the following references:
$r_s$ radius of the work tool 15
T penetration depth of the work tool into the workpiece with respect to a distance of the depth pivot axis SA from the workpiece surface WO
$r_T$ radial distance of the axis of rotation D of the tool receptacle or the work tool from the depth pivot axis SA. The axis of rotation D pivots about the depth pivot axis SA at this distance or radius $r_T$.
α pivot angle of the axis of rotation D about the depth pivot axis SA
C distance between the guide surface 51 and the depth pivot axis TS
$h_{FS}$ height of the guide rail 50
SBm vertex of the work tool 15 or center of the work tool 15

In the start position shown in FIG. 7 in operation with the guide rail 50, i.e. at a sawing depth=ST0 at which the work tool 15 does not yet engage in the workpiece W but is positioned slightly above, a distance AB results between the depth pivot axis SA and the vertex SBm of the work tool 15 parallel to the guide surface 32, for example as follows:

$$AB(ST0) = \sqrt{rT^2 - t0^2} \quad (1)$$

wherein t0 is the vertical distance between the depth pivot axis SA and the axis of rotation D from the workpiece surface WO.

Before the work tool 15 cuts into the workpiece W, the control device 80 e.g. determines the front machining edge KE as a distance between the marking sensor 62 and the vertex SBm of the work tool 15 which is located slightly above the workpiece surface WO, as a difference between the distance of the marking sensor 60 from the depth pivot axis SA and the distance AB (ST0). These values can also be permanently stored in the control device 80, in particular in the memory 82.

When the machine tool 10 is then moved into the direction of the machining start point BB to an extent that the machining edge KB is at the workpiece reference RB, the control device 80 actuates the servomotor 22, in particular to continuously move the tool receptacle 13 or the drive unit 11 into a lower depth adjustment position, for example into the depth adjustment position T3. The tool receptacle 13 stays in this position until the front machining edge KE, viewed in the regular working direction AR, has arrived at the machining end point BE. The control device 80 or the depth adjustment device 70 can determine the path traveled along the machining path BA and thus the distance from the machining end point BB, for example by means of the travel sensor 62. Continuous adjustment of the tool receptacle 13 means that the tool receptacle 13 is continuously moved, starting from the machining start point BB, further towards the lower depth adjustment position T3 at another continuous advance movement of the machine tool 10 in the regular working direction AR, which is outlined in FIG. 3, e.g. by the depth adjustment positions T11 and T12. The depth adjustment positions T11 and T12 are longitudinal positions X11 and X12 of the work tool 15 or the tool receptacle 13 with respect to the regular working direction AR. If the advance movement of the machine tool 10 along the regular working direction AR stalls, for example in the depth adjustment position T11, that is, the machine tool 10 is not moved further in the working direction AR but stops at longitudinal position X11, the tool receptacle 13 stays in the depth adjustment position T11 and is not moved towards the depth adjustment position T12 until the machine tool 10 has been moved in the working direction AR to a longitudinal position assigned to the depth adjustment position T12.

A ratio between a current sawing depth ST at which the work tool 15 cuts into the workpiece W and a distance SL between the front machining edge KB and the rear machining edge KE, which for example corresponds to a chord of a circular saw blade having a radius rs, can be determined as follows:

$$ST = rs - \frac{1}{2}\sqrt{4 \times rs^2 - SL^2} \qquad (2)$$

The distance SL could also be called the length of a sawing section. To illustrate the distance SL in FIG. 7, the work tool 15 is shown in FIG. 7 in dashed lines in a state in which it is plunged into the workpiece W.

As the saw depth increases, the distance SL becomes greater and the front machining edge KE is moved forward in the regular working direction AR, and at the same time the rear machining edge KB is moved backward with respect to the regular working direction AR, even if the machine tool 10 were to remain stationary with respect to the regular working direction AR.

The control device 80 considers this relation according to equation (2) and actuates the servomotor 22 for setting the respective permissible saw depth ST, such that the rear machining edge KB cuts into the workpiece W at the machining start point BB and the front machining edge KE retracts from the workpiece W at the machining end point BE. The control device 80 also considers the adjusting movement of the machine tool 10 along the machining path BA, for example by means of the travel sensor 62.

Furthermore, the control device 80 advantageously considers the distance between the vertex SBm of the work tool 15 and the depth adjustment axis SA parallel to machining path BA when determining the current location of the front machining edge KE and/or the rear machining edge KB. The vertex SBm moves in a circular path about the depth adjustment axis SA. For example, the control device 80 determines the position of the front or rear machining edge KE, KB depending on the angle α.

The travel sensor 62 determines an adjustment of the machine tool 10 along the machining path BA. This adjusting movement is on the one hand superimposed by the pivot movement of the work tool 15 about the depth adjustment axis SA, such that the front and rear machining edges KE and KB include an additional, superimposed motion component in the regular working direction AR or against the same (a reverse movement of the machine tool 10), on the other hand superimposed by another movement of the front and rear machining edges KE and KB which results from the respective saw depth ST. Both are considered by the control device 80 when actuating the servomotor 22 and/or determining the predetermined depth value TV.

At the machining end point BE, the control device 80 can actuate the servomotor 22 for continuous adjustment of the tool receptacle 13 into an upper depth adjustment position in which the work tool 15 does no longer engage in the workpiece W even before reaching the workpiece reference RE. But moving the tool receptacle 13 as fast as possible or suddenly into the upper depth adjustment position is preferred. To this end, the servomotor 22 rotates at maximum speed, for example.

For example, the control device 80 determines a distance value DE of the machining edge BK from the machining end point BE in order to determine the predetermined depth value TV based on the distance value DE in such a manner that the work tool 15 retracts from the workpiece W at the machining end point BE.

Furthermore, the control device 80 and/or the depth adjustment device 70 can determine the current position of the front and rear machining edges KE and KB by means of sensors 47, 48. The sensors 47, 48 are for example cameras, optical sensors, or comprise optical sensors which are arranged in the region of the front and rear machining edges KE and KB of the work tool 15, in particular on or in the protective housing 26.

The invention claimed is:

1. A method for operating a mobile machine tool for machining a workpiece, wherein the machine tool comprises a guide element having a guide surface for relatively guiding the machine tool and a workpiece surface of the workpiece towards one another along a machining path, wherein the machine tool comprises a drive unit having a drive motor for driving a tool receptacle arranged on the drive unit for receiving a work tool, wherein the machine tool comprises a detection device for detecting at least one workpiece reference which is assigned, with respect to a machining path, to a machining start point where the work tool is intended to start the machining of the workpiece or to a machining end point where the work tool is intended to end the machining of the workpiece, wherein the tool receptacle is designed for rotationally driving the work tool about an axis of rotation and for adjusting the penetration depth of the work tool into the workpiece by means of a depth adjustment device of the machine tool between depth adjustment positions, wherein the work tool has, on a radially outer circumference of the work tool, a cutting region for cutting into the workpiece, thereby forming a machining edge which is at different distances from the at least one workpiece reference depending on at least two depth adjusting positions in which the work tool projects at different distances from the guide surface wherein the method comprises determining a distance value of a distance of the machining edge from the at least one workpiece reference and determining a predetermined depth value for the depth adjustment position depending on the distance value.

2. A mobile machine tool for machining a workpiece, wherein the machine tool comprises a guide element having a guide surface for relatively guiding the machine tool and a workpiece surface of the workpiece towards one another along a machining path, wherein the machine tool comprises a drive unit having a drive motor for driving a tool receptacle arranged on the drive unit for receiving a work tool, wherein the machine tool comprises a detection device for detecting at least one workpiece reference which is assigned, with respect to a machining path, to a machining start point where the work tool is intended to start the machining of the workpiece or to a machining end point where the work tool is intended to end the machining of the workpiece and wherein the tool receptacle is designed for rotationally driving the work tool about an axis of rotation and for adjusting the penetration depth of the work tool into the workpiece by means of a depth adjustment device of the machine tool between depth adjustment positions, wherein the work tool has, on a radially outer circumference of the work tool, a cutting region for cutting into the workpiece, thereby forming a machining edge which is at different distances from the at least one workpiece reference depending on at least two depth adjusting positions in which the work tool projects at different distances from the guide surface, and wherein the depth adjustment device determines a distance value of the distance of the machining edge from the at least one workpiece reference and determines a predetermined depth value for the depth adjustment position depending on the distance value.

3. The machine tool according to claim 2, wherein the depth adjustment device is designed for continuously determining the predetermined depth value depending on a relative movement of the machine tool and the workpiece with respect to the machining path.

4. The machine tool according to claim 2, wherein the machine tool guides the work tool along the machining path in a working direction.

5. The machine tool according to claim 4, wherein the depth adjustment device is designed to output the predetermined depth value indicating plunging of the work tool into the workpiece for movement in the working direction when a rear machining edge, viewed in the working direction, reaches the machining start point and/or is designed for outputting a predetermined depth value indicating the work tool retracting from the workpiece when a front machining edge, viewed in the working direction, reaches the machining end point.

6. The machine tool according to claim 4, wherein the depth adjustment device is designed for outputting the predetermined depth value indicating retraction of the work tool from the workpiece if the work tool is moved by a predetermined measure against the working direction and/or if a rear machining edge, viewed in the working direction, reaches the machining start point.

7. The machine tool according to claim 4, wherein the work tool and/or the tool receptacle, when moving between the at least two depth adjustment positions, passes through a motion path having a directional component parallel to the guide surface and a directional component orthogonal to the guide surface and the depth adjustment device is designed for determining the predetermined depth value depending on an adjustment of a front machining edge and/or a rear machining edge depending on the directional component parallel to the guide surface.

8. The machine tool according to claim 7, wherein the directional component parallel to the guide surface is caused by pivoting the tool receptacle about a depth adjustment axis at a pivot angle.

9. The machine tool according to claim 7, wherein a travel sensor is arranged outside a detection range of a marking sensor on the machine tool, and/or is arranged at a transverse distance from the machining edge and/or wherein the travel sensor and the marking sensor have physical measuring principles that differ from one another.

10. The machine tool according to claim 4, wherein a distance between a front machining edge and a rear machining edge is dependent on a penetration depth of the work tool into the workpiece and the depth adjustment device is designed for determining the predetermined depth value depending on an adjustment of the front machining edge and/or the rear machining edge depending on the penetration depth of the work tool.

11. The machine tool according to claim 2, wherein the machine tool has a travel sensor for determining a path length of a relative movement of the machine tool and the workpiece.

12. The machine tool according to any one of claim 11, wherein the travel sensor can comprise or be formed by at least one rolling member for rolling along a surface of the workpiece and/or at least one optical detection element, and/or at least one position sensor and/or at least one magnetic sensor for detecting a geomagnetic field and/or at least one acceleration sensor.

13. The machine tool according to claim 11, wherein the travel sensor and/or the marking sensor comprises, or is formed by, a camera and/or an optical sensor and/or an inductive sensor and/or a sensor operable by an actuating action of an operator for determining a virtual workpiece marking of the workpiece.

14. The machine tool according to claim 11, wherein the marking sensor forms an assembly separate from the machine tool and can be moved relative to the workpiece irrespective of the machine tool.

15. The machine tool according to claim 2, wherein the detection device is an actuating device operable by an operator for detecting the marking and/or comprises a marking sensor having a workpiece detection range directed at the workpiece when the machine tool is in operation for determining the at least one workpiece reference if the workpiece reference is attached to, or arranged at, or assigned to, the workpiece.

16. The machine tool according to claim 2, wherein the machine tool has at least one marking sensor having a workpiece detection range which is directed at the workpiece when the machine tool is in operation to determine the at least one workpiece reference if the workpiece reference is attached to, or arranged on, or assigned to, the workpiece, and has at least one travel sensor separate from the marking sensor to determine a path length of a relative movement of the machine tool and the workpiece, after determining the at least one workpiece reference.

17. The machine tool according to claim 2, wherein the depth adjustment device is designed for determining the predetermined depth value depending on a distance of the guide surface from the workpiece surface.

18. The machine tool according to claim 2, wherein the depth adjustment device comprises at least one detection element for detecting an initial distance and/or a presence of a guide rail between the guide surface and the workpiece surface, wherein the guide rail can be placed onto the workpiece surface and the guide element can be guided on the guide rail along the machining path.

19. The machine tool according to claim 2, wherein the depth adjustment device has a depth adjustment bearing on which the tool receptacle is linearly mounted with respect to the guide surface and/or is mounted for pivoting about a depth pivot axis.

20. The machine tool according to claim 19, wherein the depth adjustment device is designed for determining the distance value of the machining edge from the at least one workpiece reference depending on an angular position of the tool receptacle by which the tool receptacle is pivoted relative to the guide surface about the depth pivot axis.

21. The machine tool according to claim 2, wherein the depth adjustment device comprises a depth sensor for determining the depth adjustment positions of the tool receptacle relative to the guide surface.

22. The machine tool according to claim 21, wherein the depth sensor comprises an angle sensor for detecting an angular position of the tool receptacle by which the tool receptacle is pivoted relative to the guide surface about the depth pivot axis.

23. The machine tool according to claim 2, wherein the depth adjustment device is designed and/or intended for manual adjustment by an operator into the at least one depth adjustment position and/or comprises at least one return spring for adjusting the tool receptacle in the direction of a depth adjustment position at which the work tool does not project from the guide surface.

24. The machine tool according to claim 2, wherein the depth adjustment device comprises a servomotor for adjusting the tool receptacle into at least one depth adjustment position and/or a depth stop for the tool receptacle and/or a braking means for braking the tool receptacle in at least one depth adjustment position which can be actuated based on a predetermined braking value.

25. The machine tool according to claim 24, wherein the machine tool has a control device for controlling the servomotor as a function of the predetermined depth value.

26. The machine tool according to claim 24, wherein the machine tool has a coupling means for detachably coupling the servomotor and/or the braking means to the tool receptacle.

27. The machine tool according to claim 2, wherein the machine tool has an output device for outputting the predetermined depth value for an operator of the machine tool.

28. The machine tool according to claim 2, wherein the work tool has a cutting blade.

29. The machine tool according to claim 2, wherein the machine tool has at least one control element, which must permanently and/or at predetermined time intervals during operation be actuated by an operator of the machine tool to maintain operation of the machine tool.

30. The machine tool according to claim 2, wherein the machine tool has at least one handle that is fixedly attached to the guide element and/or at least one handle that is fixedly attached to the drive unit.

31. The machine tool according to claim 2, wherein the machine tool forms part of a system comprising the machine tool and a guide rail that can be placed onto the workpiece, wherein guide contours extending along a longitudinal axis on the guide rail and the guide element and engaging in one another in the use position of the system are arranged for guiding the guide element along the machining path.

32. The machine tool according to claim 2, further comprising at least one sensor with a detection range directed at the outer circumference of the work tool for determining a front machining edge and/or a rear machining edge.

* * * * *